Jan. 4, 1927.
H. F. OBERGFELL
1,612,875
AUTOMATIC CHARGING AND VOLTAGE REGULATING SYSTEM
Original Filed June 11, 1919
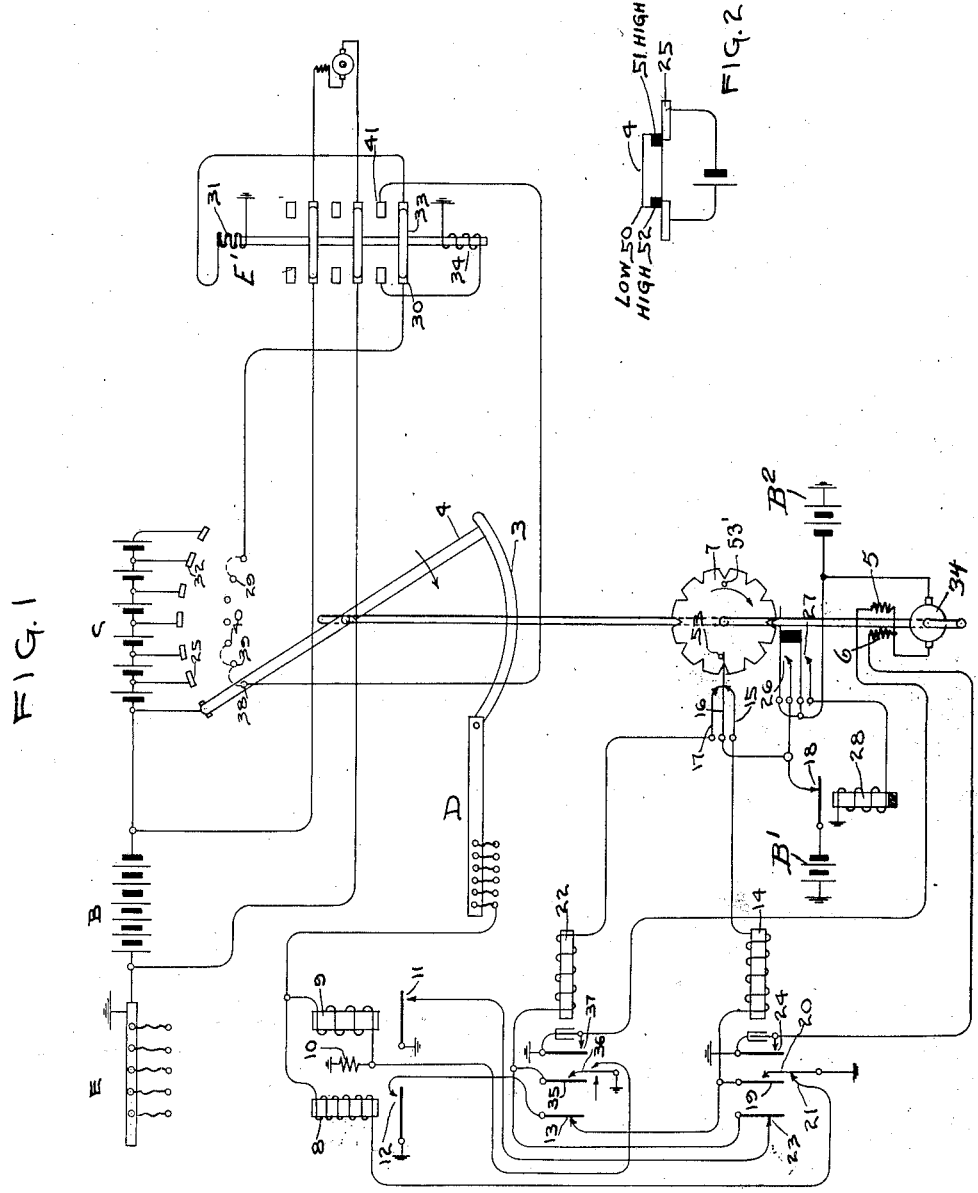
Inventor
Herbert F. Obergfell
Atty.

Patented Jan. 4, 1927.

1,612,875

UNITED STATES PATENT OFFICE.

HERBERT F. OBERGFELL, OF RIVER FOREST, ILLINOIS, ASSIGNOR, BY MESNE ASSIGNMENTS, TO AUTOMATIC ELECTRIC INC., OF CHICAGO, ILLINOIS, A CORPORATION OF DELAWARE.

AUTOMATIC CHARGING AND VOLTAGE-REGULATING SYSTEM.

Application filed June 11, 1919, Serial No. 303,329. Renewed April 1, 1924.

My invention relates in general to automatic charging and voltage regulating means for regulating the voltage of storage batteries, and is especially adapted to the batteries used in a telephone system either manual or automatic. I have explained my invention in connection with a battery of 48 volts such as is commonly used in an automatic telephone system.

More specifically my invention relates to an improved method of cutting counter cells in and out automatically during the charging or discharging of a storage battery to maintain the voltage delivered to the battery leads constant or within certain high or low limits.

I accomplish this result by the use of an automatic switch controlled by high and low voltage relays to either cut out or cut in end cells, said switch also having means for starting or stopping the charge at any desired point.

The above and other features of the invention will be described fully hereinafter reference being had to the accompanying drawings forming part of this specification.

Referring now to the drawings, in Fig. 1, I have shown by means of conventional circuit diagrams the manner of carrying out my invention. Fig. 2 shows a detail view of one of the parts of the invention.

In the drawing, Fig. 1, I have shown a battery B of 48 volts (for instance) connected to a number of counter E. M. F. cells C. The battery bus bar of the system from which battery current is distributed is shown at D and the ground bus bar is shown at E. The battery bus bar D has its connection with the non-grounded terminal through a long circular contact 3, a double ended wiper 4 and through this wiper and as many of the counter cells C as are necessary, to the terminal of battery B. While in the drawings I have shown a plurality of batteries, B, B' and B², it will be understood that they are preferably the same battery.

The wiper 4 is driven by a controlling motor which I have shown only diagrammatically at 34, windings 5 and 6 thereof being shown and adapted to drive the motor in either direction to move the wiper 4 back and forth over the contact leads of the counter cells. The cam 7 is attached to the same shaft of the motor with the wiper 4 and rotates with the wiper to operate certain controlling springs.

At E' I have shown a circuit closing device in the form of a solenoid having a winding at each end, adapted to draw the bar forward and back to connect the charging current to the battery B and also to prepare the circuits of its own two windings. That is, in its charging position, as shown in the drawing, the circuit of its upper solenoid winding 31 is prepared which is adapted when energized to pull the switch into its alternate position to disconnect the charging circuit and prepare a circuit for its lower solenoid winding 34 which is adapted to operate in the reverse manner.

I will now explain the operations of the various magnets in detail during the charging and discharging of the battery B. Assume the apparatus to be in the position shown with the charging circuit closed by the solenoid switch E' and the battery therefore rising in voltage under charge. I have shown a pair of relays 8 and 9 bridged across the terminals of the battery B in such a manner that they will be oppositely affected by rise and fall of potential across the battery. The relay 9 is normally energized through a resistance 10 and is of such resistance that when the voltage to the bus bar D falls below a certain value (such as 46 volts) this relay will fall back and close the springs 11. The relay 8, however, is bridged directly across the battery through bus bar D and wiper 4 and is of such resistance that it will not attract its armature until the battery voltage reaches a maximum (such as 52 volts). Assuming the voltage to be rising under charge, then as soon as it reaches 52 volts relay 8 will energize and close the springs 12. The closure of springs 12 completes a circuit from ground through said springs, through springs 13, relay 14, springs 15 and 16, springs 18, and battery B'. Relay 14 immediately energizes and locks itself energized through springs 19 and 20, opens the circuit of relay 8 at springs 20 and 21; opens the circuit of relay 22 at springs 23, and closes a circuit for the winding 6 of the motor at springs 24. The winding 6 is arranged to rotate the wiper 4 and the cam 7 in the direction indicated by the arrows, wiper 4 operating to step to the contact 25 to thereby include one of the counter cells C in series with the battery B to reduce its voltage. As soon as the cam 7 started to rotate it closed the springs 26 and 27. Springs 27 close the circuit of slow acting relay 28 to open springs 18 to open the original energizing circuit of relays 14 and 22. But springs 26 connect the battery B² to said circuit to hold relay 14 energized until wiper 4 reaches the next contact at which time springs 26 open, relay 14 falls back and the circuit of motor winding 6 is opened to stop the wiper 4 before it can be further rotated. It will be seen that when relay 14 falls back and closes the circuit of relay 8, that said relay 8 will not energize again due to the lowering of the voltage caused by the insertion of the counter cell. However, as the battery voltage continues to rise, relay 8 will again energize, operate relay 14 and again cause the motor to rotate wiper 4 to cut in another counter cell. This operation continues as long as the voltage continues to rise and until the wiper 4 reaches a point where it is desirable to cut off the charge. This is accomplished by means of the row of contacts just inside the contacts leading to the counter cells. For instance, if it is desired to stop the charge after 5 counter cells have been cut in, then the contact 29 is connected as shown by the dotted line to the contact 30 of the solenoid charging switch E', which is connected through a wiper of the switch to the solenoid winding 31. When the wiper 4 reaches the contact 32 to cut in the fifth counter cell then a circuit is closed from battery B through counter cells C, wiper 4, contact 29, contact 30 and wiper 33, and through solenoid magnet 31 to ground. Magnet 31 energizes to move the solenoid bar carrying the wipers to open the charging circuit and to open its own circuit and prepare the circuit of solenoid magnet 34 by moving wiper 33 up one step. As soon as the charge is cut off the voltage of the battery will of course start to fall slightly due to the load and as soon as the voltage falls to 46 volts or to the minimum limit to which the relay 9 is adjusted, relay 9 will fall back and close a circuit at springs 11, through springs 23 and relay 22 to the battery B' through springs 16 and 18. Relay 22, upon energizing locks itself energized through springs 35 and 36, short circuits resistance 10 to cause relay 9 to pull up again, opens springs 13 in the circuit of relay 14, and closes springs 37 in the circuit of winding 5 of the motor. Winding 5 is arranged to rotate the shaft of the motor in such a manner as to revolve the wiper 4 and cam 7 in a direction opposite to that indicated by the arrows, wiper 4 therefore operating in this case to cut out one of the counter cells C to increase the voltage to the bus bar D. The cam 7 operates in the same manner as before to hold relay 22 (in this case) energized by means of springs 26 and 27 until wiper 4 has taken a full step. As the battery voltage continues to fall on discharge, relay 9 will operate in the same manner as relay 8 did upon charge and gradually cut out the counter cells until the wiper 4 meets the last contact 38. If it is desired to cut on the charging circuit while there are still one or two counter cells cut in, then contacts 39 and 40 will be connected as shown by dotted lines. When the wiper 4 reaches whichever contact is so connected then a circuit is completed for the solenoid magnet 34 through the wiper 4, contact 41, and wiper 33. Magnet 34 operates to close the charging circuit, open its own circuit and again prepares the circuit of magnet 31.

The wiper 4 is a specially constructed wiper formed of carbon elements of high and low resistance as it will be understood that the circuit from the battery B to the bus bar D must not be opened as wiper 4 moves from one contact such as 25 to another, and also that the counter cells C must not be short circuited. I have shown in Fig. 2 an enlarged detail view of the portion of the wiper 4 which wipes over contacts 25. In this figure I have shown a pair of contacts 25 with a counter cell bridged between them and with the brush 4 in a position passing from one to the other. The element 50 of the wiper 4 is of low resistance carbon or other element, while the elements 51 and 52 are formed of high resistance carbon, so that the circuit from contact 25 to its other counter cell contact must pass through one or both of the high resistance elements 51 and 52, but as soon as wiper 4 reaches a single contact 25 then the current passes directly through the low resistance element.

The springs 15, 16 and 17 which are associated with the cam wheel 7 are in the nature of a precautionary measure to render the equipment inoperative in case the charging switch fails to properly function or for any other reason the voltage rises too far or falls too far. That is, in case the relays have cut in all of the counter cells and have therefore rotated the cam 7 to its farthest point, pin 53' opens the springs 15 and 16 to prevent further operation of relay 14, while if all the counter cells are cut out and the relays attempt to rotate the wiper 4 farther, then the pin 53 opens the springs 16 and 17 to prevent further operation of relay 22.

It will be seen, therefore, that I have provided a highly efficient and satisfactory method of maintaining the voltage of a battery constant during both charge and discharge thereof, by the automatic switching in and out of counter cells in the battery lead. And also I have provided a satisfactory method of automatically cutting off or supplying charging current to the battery at any desired point in the charged or discharged condition of the battery.

Having fully described and ascertained the features and aspects of my invention, what I consider to be new and desire to have protected by Letters Patent will be pointed out in the appended claims.

What I claim as my invention is:

1. In combination with a pair of mains, a storage battery for supplying current thereover, a generator for charging the battery, and means for preventing the rise in voltage across said mains of more than a given amount, said means comprising a series of counter electromotive cells and an automatic switch adapted to shift the connection of one of said mains to interpose one or more of said counter cells between said last mentioned main and one of the terminals of said battery and to automatically connect and disconnect said generator to and from said battery proper.

2. In combination with a pair of mains, a storage battery for supplying current thereover, a generator for charging the battery, and means for preventing the rise in voltage across said mains of more than a given amount, said means comprising a series of counter electromotive cells and an automatic switch adapted to shift the connection of one of said mains to interpose one or more of said counter cells between said last mentioned main and one of the terminals of said battery, and to automatically connect and disconnect said generator to and from said battery proper, said switch being responsive to a rise in voltage across the mains equal to the said given amount.

3. In combination with a pair of mains, a storage battery for supplying current thereover, a generator for charging the battery, and means for preventing the rise in voltage across said mains of more than a given amount, said means comprising a series of counter electromotive cells and an automatic switch adapted to shift the connection of one of said mains to interpose one or more of said counter cells between said last mentioned main and one of the terminals of said battery, and to automatically connect and disconnect said generator to and from said battery proper, said switch responsive to a rise in voltage across the mains equal to the said given amount, said switch adapted to respond a plurality of times whereby a plurality of counter cells may be cut in one at a time across said mains in opposition to said battery.

4. In combination with a pair of mains, a storage battery for supplying current thereover, a generator for charging the battery over a circuit including only the battery proper, and means for preventing the rise in voltage across said mains of more than a given amount, said means comprising a series of counter electromotive cells and a switch adapted to shift the connection of one of said mains to interpose one or more of said counter cells between said last mentioned main and one of the terminals of said battery, said switch being responsive to a rise in voltage across the mains equal to the said given amount, said switch adapted to respond a plurality of times whereby a plurality of counter cells may be cut in one at a time across said mains in opposition to said battery, said switch adapted after a series of counter cells have been cut in to cut off the charging generator from the battery.

5. In combination, a storage battery having a charging and a discharging circuit each independent of the other, counter electromotive cells, a rotary switch arm controlled by a rise and fall of the voltage in said discharging circuit for opening and closing said charging circuit and for cutting said counter cells in and out of the discharge circuit during the charging and discharging of the battery.

6. In combination with a pair of mains, a storage battery for supplying current thereover, a generator for charging the battery, and means for preventing a fall in potential across said mains of more than a given amount, said means comprising a series of counter electromotive cells interposed between one of said mains and said battery, said means including an automatic switch adapted to shift the connection of said last mentioned main to eliminate one or more of said counter cells in the connection between said battery and said last mentioned main, said switch being responsive to a fall in voltage across the mains equal to said given amount to shift said connection and to also connect said generator to the battery.

7. In combination with a pair of mains, a battery for feeding current thereover, a generator for charging said battery, a series of counter electromotive cells associated with said battery, a progressively movable switch, means for moving said switch as the voltage in the battery rises to interpose counter electromotive cells between the battery and the mains for preventing the voltage from rising above a certain amount, and for disconnecting said generator, said means moving said switch for eliminating the counter cells between said battery and the main as the voltage of the battery falls to prevent the fall of the voltage across the mains below a certain amount, and responsive to the fall in voltage for connecting the generator with said battery for charging the battery.

8. In combination with a pair of battery mains, a storage battery for feeding current to said mains, one main connected to one side of the battery and the other to the other, a generator for charging said battery, a series of counter-electromotive cells associated with said battery, a progressively movable step by step switch provided with means responsive to the rise in potential of said battery to take one step each time that the potential increases a given amount, a second switch responsive to said first switch when the first switch has taken a series of steps for cutting out said generator when the voltage of the battery has risen to a given point, said switch being responsive thereafter to a fall in potential in said battery to take a step for each drop in voltage of a given amount, said second switch controlled by said first switch when said first switch has taken a series of steps, as a result of the voltage of the battery having fallen to a given point to connect the generator across the battery.

9. In combination with a pair of battery mains, a storage battery for feeding current to said mains, one main connected to one side of the battery and the other to the other, a generator for charging said battery, a series of counter-electromotive cells associated with said battery, a progressively movable step by step switch provided with means responsive to the rise in potential of said battery to take one step each time that the potential increases a given amount, a second switch responsive to said first switch when the first switch has taken a series of steps for disconnecting said generator when the voltage of the battery has risen to a given point, said switch being responsive thereafter to a fall in potential in said battery to take a step for each drop in voltage of a given amount, said second switch controlled by said first switch when said first switch has taken a series of steps, as a result of the voltage of the battery having fallen to a given point to connect the generator across the battery, a series of counter electromotive cells, said switch adapted to interpose one of the counter cells between said battery and one of said mains each time it takes a step due to a rise in potential, said switch also adapted to eliminate one of said counter electromotive cells between the said last mentioned main and said battery each time that it takes a step in response to the fall of potential in the battery.

10. In combination with a pair of mains, a battery for feeding current thereover, a generator for charging said battery, a series of counter electromotive cells associated with said battery, a progressively movable switch, means responsive to a rise in potential across said mains for interposing said cells one by one in series with the battery and across the mains to prevent the potential across the mains from rising more than a given amount, and means controlled by the rise in voltage across the battery proper to a certain amount for disconnecting the generator from the battery to stop the charge, said charging circuit including only the generator and battery proper.

11. In combination with a pair of mains, a battery for feeding current thereover, a generator for charging said battery, a series of counter electromotive cells associated with said battery, a progressively movable switch, said switch responsive to a fall in potential across said mains to eliminate said cells one by one in series with the battery and across the mains to prevent the potential across the mains from falling more than a given amount, and controlled by the fall in voltage across the battery proper to a certain amount for connecting the generator across the battery proper for charging the same.

12. In combination with a pair of mains and a battery for feeding current thereover, a generator for charging the battery, a series of counter electromotive cells, a progressively movable switch, said switch responsive to a rise in potential across the mains of more than a given amount to move in one direction to insert counter cells in opposition to the battery across the mains and responsive to a fall in potential across the mains of more than a given amount to move in another direction to cut out counter cells from across the mains, and means controlled by the switch after it has cut in a certain number of counter cells for cutting off the generator to stop the charge and after it has cut out a certain number of cells when moving in the other direction to connect the generator across the battery to charge the same.

13. In combination with a pair of mains and a battery for supplying current thereto, a generator adapted to be connected to the battery for charging the same, a progressively movable switch between one of said mains and the battery, responsive to a rise in the voltage of the battery of more than a given amount while the generator is connected to charge the battery to cut in counter electromotive cells to maintain the voltage across the mains constant and responsive to a fall in voltage of a certain amount to cut out counter cells while the generator is disconnected and the battery is being discharged, and means controlled by the switch for preventing the charging of the battery until a certain number of the counter cells have been cut out.

14. In combination with a pair of mains and a battery for supplying current thereto, a generator adapted to be connected to the battery for charging the same, a progressively movable switch between one of said mains and the battery responsive to a rise in the voltage of the battery of more than a given amount while the generator is connected to charge the battery to cut in counter electromotive cells to maintain the voltage across the mains constant and responsive to a fall in voltage of a certain amount to cut out counter cells while the generator is disconnected and the battery is being discharged, means controlled by the switch for preventing the charging of the battery until a certain number of the counter cells have been cut out, and means for preventing the cutting off of the generator to stop the charge until a certain number of the cells have been cut in.

15. In combination with a pair of mains and a battery connected to said mains to supply current thereto of a motor carrying a wiper which is in series with the mains and the battery, a series of counter electromotive cells over which one end of the wiper passes to include the cells in series with the battery and mains to regulate the voltage across the mains, and means controlled by the wiper at any predetermined point in its travel to connect or disconnect a source of current to the battery for charging the battery over a circuit exclusive of said counter cells.

16. In combination with a storage battery, a generator and counter electromotive cells, the provisions of automatic means for connecting the generator to the battery to charge the same over a circuit exclusive of said counter cells, and for then cutting said counter cells one at a time in series with said battery, to maintain the voltage constant while charging, said means also operating to disconnect the charging circuit when the charge has reached a certain point and for then cutting out the counter cells one at a time as the battery is discharged.

17. In combination with a pair of mains, a battery for supplying current thereto, a motor having a wiper connected in series with the battery and the mains, a series of counter electromotive cells adapted to be connected in series with the battery and mains by said wiper, a pair of devices connected across the mains, one responsive to increases in the potential across the mains to operate the motor to move its wiper in one direction to inculde counter cells, the other responsive to decreases in voltage across the mains to cut out counter cells, and another switch controlled conjointly by the devices and the wiper to connect and disconnect a source of current to the battery over a circuit excluding said counter cells to allow the battery to be charged at certain times.

18. In combination, a storage battery having a charging and a discharging circuit, counter electromotive cells in said discharging circuit, means controlled by a rise and fall of voltage in said discharging circuit for opening and closing said charging circuit and for cutting said counter electromotive cells in and out of the discharging circuit during the charge and discharge of said battery.

19. In combination, a storage battery having a charging and a discharging circuit, counter electromotive cells adapted to be inserted in said discharging circuit, means controlled by a rise of voltage in said discharging circuit for inserting a plurality of said counter electromotive cells in said discharging circuit and for opening said charging circuit.

20. In combination, a storage battery having a charging and a discharging circuit, counter electromotive cells adapted to be inserted in said discharging circuit, means controlled by a rise of voltage in said discharging circuit to a predetermined point for inserting a plurality of said counter electromotive cells in said discharging circuit during the charging of said battery and for finally opening said charging circuit.

21. In combination, a storage battery having a charging and discharging circuit, counter electromotive cells adapted to be inserted in said discharging circuit, means controlled by the fall in voltage in said discharging circuit for cutting out a plurality of said counter electromotive cells and for closing said charging circuit.

22. In combination, a storage battery having a charging and discharging circuit, counter electromotive cells adapted to be inserted in said discharging circuit, means controlled by the fall in voltage in said discharging circuit to a predetermined point for cutting out a plurality of said counter electromotive cells during the discharging of said battery and for then closing said charging circuit.

23. In combination, a motor adapted to operate a shaft, a wiper attached to said shaft, contacts adapted to be engaged by said wiper, a circuit controlling device carried by said shaft, a circuit for operating said motor, a relay for closing said circuit, a circuit for locking said relay energized and means controlled by said circuit controlling device for opening said locking circuit when said wiper is moved into engagement with a predetermined one of said contacts.

24. In combination, a motor adapted to operate a shaft, a wiper attached to said shaft, contacts adapted to be engaged by said wiper, a circuit controlling device carried by said shaft, a circuit for operating said motor, a pair of relays, means for energizing one of said relays to close the circuit of the other, means controlled by said other relay for closing said operating circuit, a locking circuit for said other relay, and means controlled by said circuit controlling device for opening said locking circuit when said wiper has been moved into engagement with a predetermined one of said contacts.

25. In a battery charging and regulating system, a relay, a circuit for said relay including a battery, said relay adjusted to energize when the voltage in the circuit rises to a predetermined point, means responsive to the energization of said relay for lowering the voltage in the circuit a definite amount, and means actuated automatically during the voltage lowering operation for momentarily opening the circuit of said relay to deenergize the same.

26. In a battery charging and regulating system, a circuit including a relay and a battery, said relay adjusted to energize when the voltage in the circuit rises to a predetermined point, a self locking relay controlled by said first relay, means controlled by the said self locking relay for lowering the voltage in the circuit a definite amount and for opening the locking circuit of said self locking relay, and contacts on said self locking relay for opening the circuit of said first relay.

27. In a battery charging and regulating system, a relay, a circuit for said relay including a battery, said relay adjusted to energize when the voltage in the circuit rises to a predetermined point, progressively movable mechanism operable in a series of steps to lower the voltage in the circuit, means responsive to the energization of said relay for opening its circuit and for starting the operation of said mechanism, and means independent of the energized condition of said relay for causing said mechanism to take a full step.

28. In a voltage regulating system, a storage battery, a normally energized relay included in a circuit with said battery adjusted to fall back when the voltage in the circuit falls to a predetermined point, means responsive to the deenergization of said relay for raising the voltage in the circuit a definite amount, and means actuated automatically during the voltage raising operation for energizing said relay.

29. In a voltage regulating system for storage batteries, a battery, a normally energized relay included in a bridge across the battery and adjusted to fall back when the voltage across the bridge falls to a predetermined point, a second relay responsive to the deenergization of said first relay, a locking circuit for said second relay, means controlled by said second relay for energizing said first relay while the voltage across the bridge remains below normal, regulating mechanism controlled by said second relay for raising the voltage a definite amount, and means controlled by said regulating mechanism for breaking said locking circuit.

30. In a voltage regulating system, a storage battery, a normally energized relay in a circuit with said battery and adjusted to fall back when the voltage in said circuit falls to a predetermined point, a resistance in series with said relay, a second relay controlled by said first relay on deenergizing, a locking circuit for said second relay, contacts on said second relay for shorting said resistance to energize said first relay, means controlled by said second relay for raising the voltage across the relay, and means for automatically opening said locking circuit when the voltage raising operation is completed.

31. In a voltage regulating system, a storage battery, counter cells, a switching device for cutting said counter cells in and out of circuit with the battery, a relay included in a circuit with the battery responsive to a change in voltage in the circuit for starting the operation of said device, means operated when the device is started for causing said relay to resume its initial position, and means independent of said relay for causing said device to complete its operation after being started.

32. In a voltage regulating system, a storage battery, counter cells, a switching device for cutting said counter cells in and out of circuit with said battery, a relay for operating said device, means responsive to a change in battery voltage for initially energizing said relay, a locking circuit for said relay, a slow acting relay controlled by said device for breaking said locking circuit at one point when the operation of the device is started, and means controlled by said device for maintaining said locking circuit closed at another point until the operation of said device has proceeded to a predetermined extent.

33. In a voltage regulating system, a storage battery, counter cells, a switching device for cutting said counter cells in and out of circuit with the battery, a relay for operating said device in one direction to cut in counter cells, a relay for operating said device in the other direction to cut out counter cells, and switching springs controlled by said device when the same reaches the limit of its movement in either direction for opening the circuit of one or the other of said relays depending on the direction of movement.

Signed at Chicago, Illinois, this 6th day of June, 1919.

HERBERT F. OBERGFELL.